J. A. TAFT.
CLUTCH.
APPLICATION FILED SEPT. 28, 1916.
1,293,242.
Patented Feb. 4, 1919.
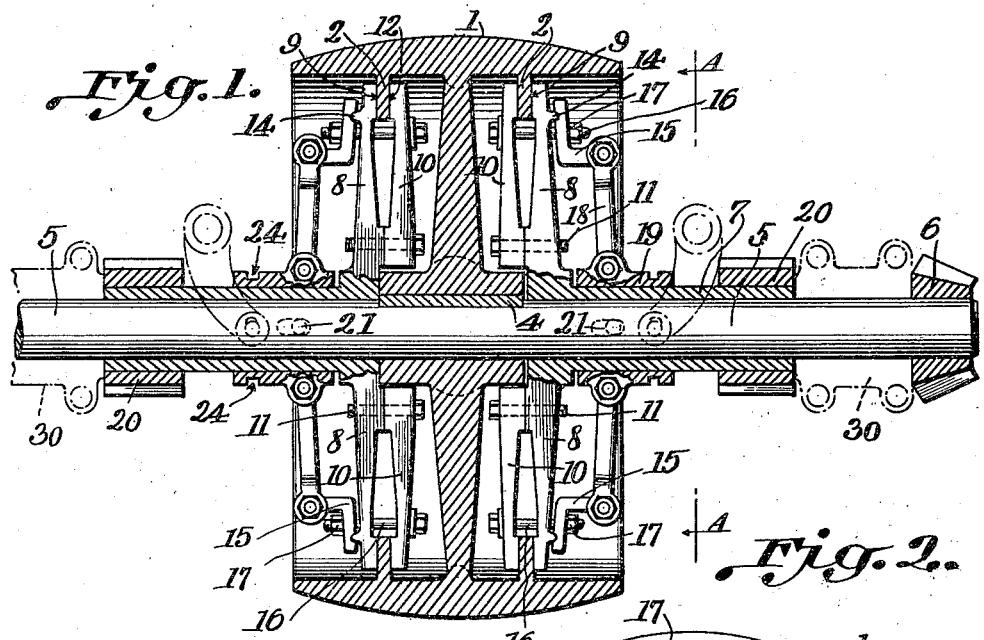
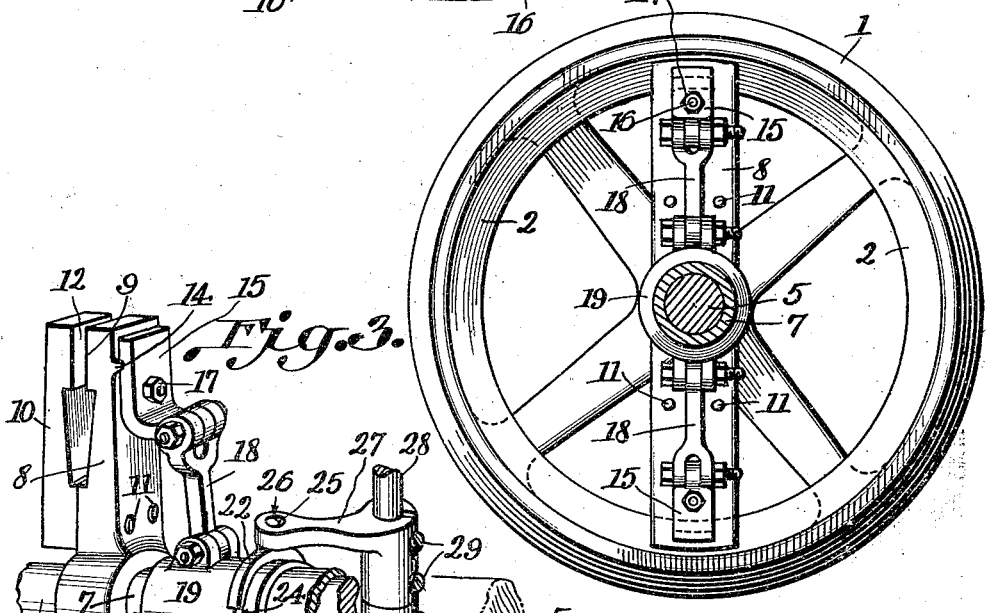
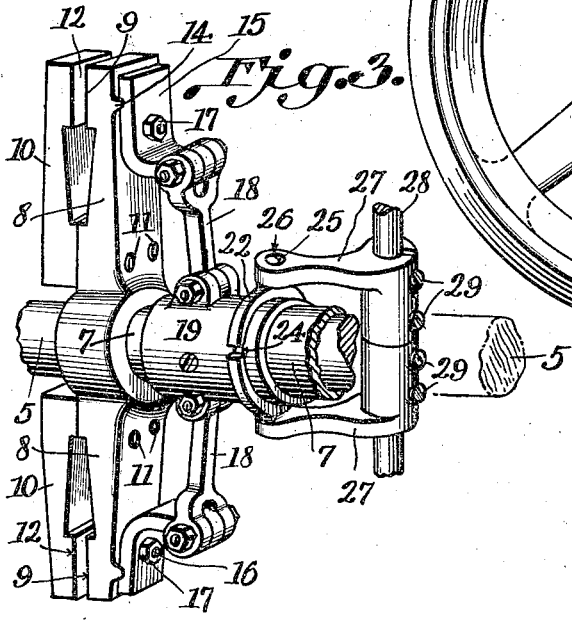
Inventor
John A. Taft
by Ramsey and Parmelee
Attys.

UNITED STATES PATENT OFFICE.

JOHN A. TAFT, OF SAN ANTONIO, TEXAS, ASSIGNOR TO REAGAN BALE COMPANY, OF SAN ANTONIO, TEXAS, A CORPORATION OF TEXAS.

CLUTCH.

1,293,242.  Specification of Letters Patent.  Patented Feb. 4, 1919.

Application filed September 28, 1916. Serial No. 122,628.

*To all whom it may concern:*

Be it known that I, JOHN A. TAFT, a citizen of the United States, and a resident of the city of San Antonio, in the county of Bexar, State of Texas, have invented certain new and useful Improvements in Clutches, of which the following is a specification.

This invention relates broadly to driving mechanism and more particularly to a friction clutch drive.

The principal object of this invention is to provide a compact and efficient friction clutch for transmitting power from a single driving member to a plurality of individual driven mechanisms.

A further object of the present invention is a drive wheel provided on each side with a pair of clutch devices in such manner that power may be transmitted from either or both sides of the drive wheel to suitable driven mechanism.

A still further object of the present invention is to provide a compact power transmitting mechanism which includes a drive wheel fixedly mounted upon a power shaft and provided with a pair of clutches operative to engage opposite sides of said drive wheel to transmit power from said drive wheel to suitable driven mechanisms on each side of said drive wheel.

A still further object of the present invention is to provide a driving wheel constructed to transmit power to a drive shaft, and provided on one side with a clutch member carried by a tubular shaft mounted upon said drive shaft and operative to transmit power from said drive wheel through said tubular shaft to a predetermined driven mechanism.

Other and further objects of the present invention will in part be obvious and will in part be pointed out hereinafter in the specification following by reference to the accompanying drawings forming a part thereof and throughout which like characters are used to represent like parts.

Figure 1 is an elevational sectional view showing details of construction.

Fig. 2 is a view taken on line A—A of Fig. 1.

Fig. 3 is a perspective view of details comprising one clutch member.

The driving mechanism comprising the clutch devices, which will hereinafter be described more in detail, and which comprise the invention disclosed in the present application are adapted for general driving purposes but are particularly designed as a part of the power transmitting mechanism for driving the rolls of a cylindrical bale twin cotton press of the type disclosed in my application Serial No. 92,391 filed April 20, 1916. In devices of this character, where a continuous flow of material must be handled, it is desirable to drive twin machines or presses from a single source of power and to this end it is preferable to locate the driving mechanism between the twin presses or machines. In devices of this character it is also desirable to use a transmission which will gradually start a rotating element from a position of rest by gradually connecting this rotating element with a continuously revolving driving member and to connect the driving and driven members positively together when the driven member has reached a speed consonant with the driving member. To this end I have provided a driving mechanism which comprises a pulley mounted at substantially the mid portion of a main shaft and fixedy connected thereto in such manner that gearing at the end of the main shaft may continuously transmit power to suitable mechanism when the pulley is rotated. The pulley is provided upon either side of its central line with a pair of annular webs or ribs which extend radially inward in a direction substantially parallel to the plane of rotation of the pulley. Tubular shafts or sleeves which carry gears at their outer ends are mounted to rotate upon the said main shaft and are provided with arms that extend outwardly and over the outer sides of said webs on the pulley. These arms carry short swinging arms which are mounted upon stud bolts with sufficient looseness to permit a slight pivotal movement so that the rigid arms and the movable arms may be brought together at their outer ends in the form of a vise clamp and to grip and engage the opposite sides of the said webs whereby the said arms are rotated with the said pulley when such rotation is desired. In order to cause the desired clamping action, L-shaped levers of the second class are fulcrumed on ridges on the fixed arms and are in engagement with screw bolts which pass through the rigid arms and are provided with heads on the inner sides of the movable arms. The outer ends of these levers are connected by means of suitable links with sliding sleeves mounted to slide over the tubular shafts previously mentioned. The sliding in or out of these sleeves causes the links and the L-shaped levers to act as toggles applying tension forces to the through bolts and thus drawing the jaws together at their outer ends and clamping the jaws tightly upon the annular ribs or webs.

Referring now more particularly to the drawings the driving pulley 1 is provided on its inner face with a pair of parallel annular ribs 2. This driving pulley 1 is secured as by means of a key 4 with the main shaft 5 which preferably carries at its outer end gears, for example the bevel gears 6. Tubular shafts or sleeves 7 are rotatably mounted on the main drive shaft 5 and are adapted to have a very slight slidable movement on this said main shaft. These tubular shafts are provided with integral rigid arms 8 that extend outwardly and lap as at 9 the outer sides of the annular ribs 2. Movable arms 10 are loosely mounted on pairs of stud bolts 11 which are tapped into the rigid arms 8, and the movable arms 10 lap as at 12 the inner sides of the annular ribs 2. The rigid arms at their outer ends are provided with a short transverse outstanding rib 14 upon which is pivoted an L-shaped lever arm 15. Through bolts 16 extend through the arms 10, the rigid arms 8, and are provided with adjusting nuts 17 that are seated on the L-shaped arms 15. Connecting links 18 extend between slidable sleeves 19 and the said L-shaped lever arms in such manner that the lever arms and the connecting links have toggle movements which apply tension forces to the through bolts 16 when the sliding sleeves 19 are moved toward the rigid arms. These tension forces clamp the outer ends of the arms together and thereby cause the driving pulley to transmit part or all of its driving forces direct to the tubular shafts 7 and through the gear 20 to suitable driven mechanism, for example cotton bale press (not shown). A short slot and pin connection is provided as at 21 between the sliding sleeve and the tubular shaft in order to relieve the links 18 from undesirable side thrusts which might be caused by the rotation of the parts. The operation of the sliding sleeves may be accomplished by means of yokes 22 which are adapted to be seated in grooves 24 provided in the outer ends of the sliding sleeves 19. These yokes 22 are formed with pins 25 which are received in elongated openings 26 provided in the outer end of arms 27 that are secured to the operating shaft 28 by means of taper pins 29. The devices hereinbefore described may be supported in suitable bearings for example bearings 30 mounted adjacent the ends of the main drive shaft.

The construction of the parts is preferably such that when the sliding collars are operated to cause the jaws to be clamped together the links 18 are preferably at substantially right angles to the sliding movement of said collars whereby there is substantially no tendency of the collars to slide when the clutches are in operative relation.

Realizing that it is possible to vary the physical embodiments of my invention without departing from the scope thereof I desire that the specific mechanism herein shown shall be considered as illustrative and not in a limiting sense.

Having described my invention, what I claim is:—

1. In a device of the character described in combination, a driving shaft, a driving pulley secured to said driving shaft, a pair of annular webs upon said pulley and on opposite sides of the center line thereof, tubular power transmitting shafts rotatably mounted upon said shaft, and means for clamping said tubular shafts to said annular webs to enable said driving shaft to drive the same.

2. In a device of the character described, a pulley, a pair of annular webs upon said pulley, a driving shaft to which said pulley is fixedly secured, rotatable tubular shafts, friction jaws operatively connected with said rotatable tubular shafts, and devices for clamping said friction jaws upon said webs to enable said pulley to drive said rotatable tubular shafts.

3. In a device of the character described in combination a driving member, a driving shaft upon which said member is fixedly mounted, friction members upon said driving member, tubular shafts rotatably mounted upon said driving shaft, clamping jaws adapted to coöperate with and engage said friction members, and means for operating said clamping jaws to engage said friction members.

4. In a device of the class described in combination, a driving pulley, a pair of webs upon said pulley and parallel to the plane of rotation of said pulley, a pair of shafts extending in opposite directions from the sides of said pulley, clamping members secured to said shafts and adapted to coöperate with said webs, and means for operating said clamping members to clamp the same upon said webs substantially as described.

5. In a device of the character described in combination, a driving pulley, a pair of friction plates upon said driving pulley, a driving shaft upon which said driving pulley is fixedly mounted, a pair of tubular shafts mounted upon said driving shaft, clamping members carried by said tubular shafts in operative position for engagement with said friction plates, and toggle devices for operating said clamping members.

6. In a device of the character described in combination, a driving shaft, a driving member mounted upon said shaft, a friction member carried by said driving member, a pair of clamping jaws adapted to engage said friction member, driven means connected with said clamping jaws, one of said clamping jaws of each pair being rigidly carried by said driven means and pivotally supporting the other jaw, a tension member extending through said clamping jaws, a lever of the second class connected with said tension member and fulcrumed on one of said clamping jaws, a sliding member, and a rigid link connecting said sliding member with said lever in such manner that movement of said sliding member operates the lever to draw the clamping jaws together.

7. In a device of the character described, in combination a driving member, a shaft upon which said driving member is mounted, friction surfaces provided upon said driving member, a tubular shaft mounted upon said first mentioned shaft, a pair of rigid arms integral with said tubular shaft and being provided on their outer ends with friction surfaces, movable arms carried by said rigid arms, a bolt fastened through each of said movable arms and said rigid arms and toggle means connected with said bolts to draw the friction faces of said arms together to clamp the same upon the friction surface of the driving member.

8. In a device of the character described in combination, a driving pulley, a driving shaft upon which said pulley is rigidly mounted, a pair of webs on said driving pulley parallel with the plane of rotation thereof, a pair of tubular shafts mounted upon said driving shaft, rigid arms integral with said tubular shafts, said arms being provided on their outer ends with friction surfaces, movable jaws mounted upon said arms and also provided on their outer ends with friction surfaces, said arms being mounted in such manner that said webs are between said arms, tension members passing through said arms, slidable collars upon said tubular shafts, and means operatively connected with said tension members to draw the friction surfaces of said arms together, substantially as described.

9. A friction clutch comprising a friction plate, a pair of pivotally connected jaws engaging the opposite sides of said friction plate, a driven shaft carrying said jaws, a bolt extending through said jaws, an L-shaped lever of the second class fulcrumed on one of said jaws and connected with said bolt, and means to cause said lever to turn upon said fulcrum to place said bolt under tension whereby said jaws are clamped upon said plate.

10. In a device of the character described, in combination a driven member and a driving member, one of said members being provided with a friction plate having friction surfaces on each side thereof, the other of said members being provided with clamping jaws, one of said clamping jaws being rigid and the other being movably carried thereby, an L-shaped lever of the second class fulcrumed on one of said jaws, a tension member extending through said jaws and connected to said lever, a sliding collar, a link connecting said lever and said sliding collar, said parts being so constructed and arranged that when said sliding collar is operated to cause said jaws to be clamped together said link is substantially at right angles to the sliding movement of said collar whereby there is substantially no tendency of said collar to slide when the said device is in operative relation.

JOHN A. TAFT.

Copies of this patent may be obtained for five cents each, by addressing the "Commissioner of Patents, Washington, D. C."